(12) United States Patent
Ohta

(10) Patent No.: US 8,251,822 B2
(45) Date of Patent: Aug. 28, 2012

(54) COMPUTER-READABLE STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/022,929

(22) Filed: Feb. 8, 2011

(65) Prior Publication Data

US 2012/0122582 A1   May 17, 2012

(30) Foreign Application Priority Data

Nov. 16, 2010   (JP) ................. 2010-256256

(51) Int. Cl.
*A63F 9/24*   (2006.01)

(52) U.S. Cl. ........................................ 463/38

(58) Field of Classification Search ..................... 463/38
See application file for complete search history.

(56) References Cited

U.S. PATENT DOCUMENTS

| 7,412,348 | B2 * | 8/2008 | Okamura ................. 702/152 |
| 2006/0094512 | A1 | 5/2006 | Yoshino et al. |
| 2007/0270222 | A1 * | 11/2007 | Yamanaka et al. ............ 463/37 |

FOREIGN PATENT DOCUMENTS

| EP | 1 621 238 | 2/2006 |
| EP | 1 671 685 | 6/2006 |
| EP | 1 741 476 | 1/2007 |
| EP | 2 228 109 | 9/2010 |
| JP | 10-105328 | 4/1998 |

* cited by examiner

*Primary Examiner* — Omkar Deodhar
(74) *Attorney, Agent, or Firm* — Nixon & Vanderhye P.C.

(57) ABSTRACT

Correcting data outputted from an input device comprises: input data acquisition for acquiring, as object data, input data outputted from the input device; and a first input data update for sequentially updating the object data, when the input data becomes equal to or greater than an upper limit defined by allowed range of input operation on the input device, until the updated object data indicates a predetermined value which is greater than the upper limit value.

26 Claims, 11 Drawing Sheets

F I G. 4
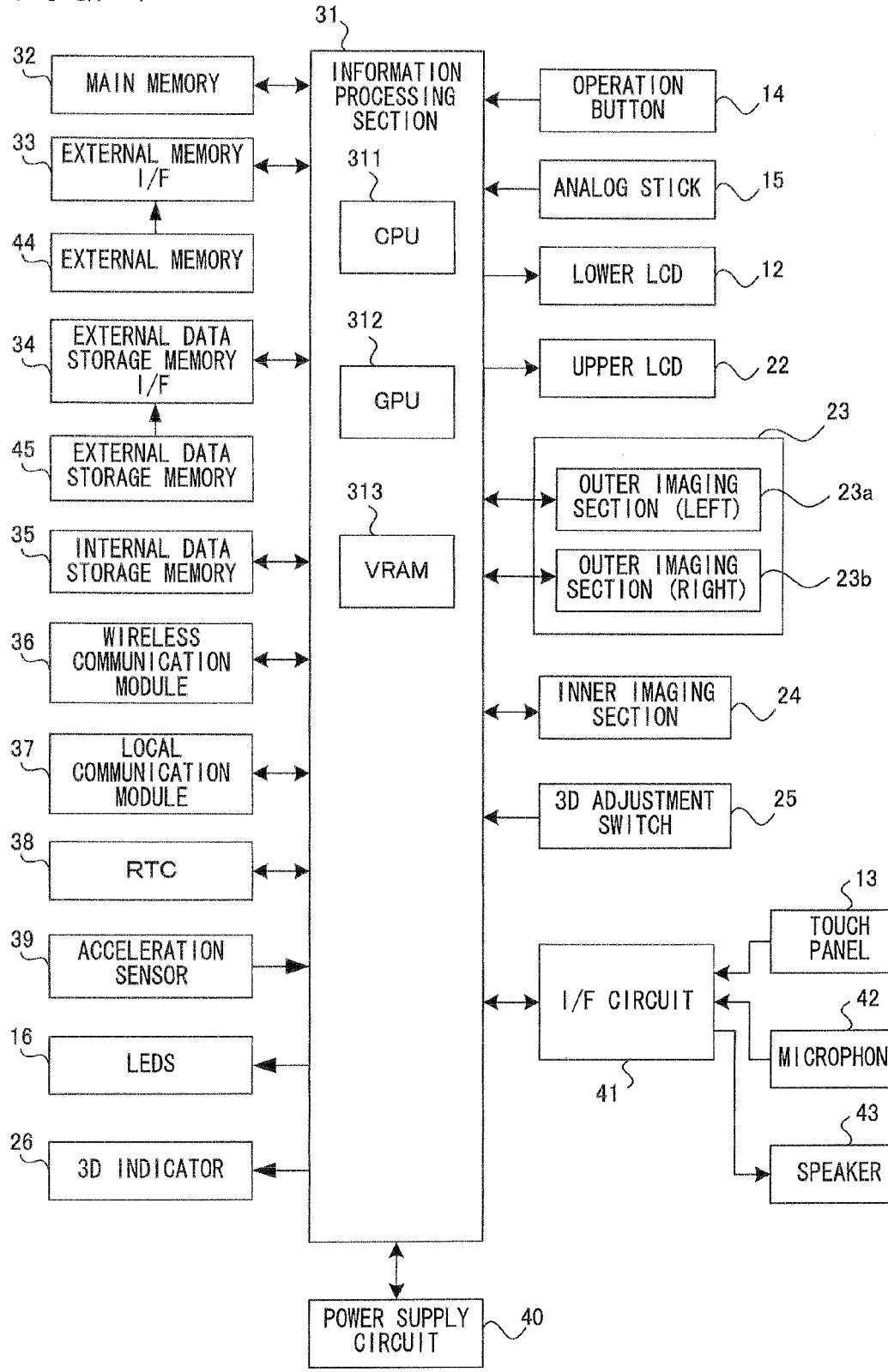

COMPUTER-READABLE STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM

CROSS REFERENCE TO RELATED APPLICATION

The disclosure of Japanese Patent Application No. 2010-256256, filed on Nov. 16, 2010, is incorporated herein by reference.

BACKGROUND

1. Field

Example embodiments of the present invention relate to a computer-readable storage medium having an information processing program stored therein, an information processing apparatus, an information processing method, and an information processing system. More specifically, example embodiments of the present invention relate to a computer-readable storage medium having stored therein an information processing program, an information processing apparatus, an information processing method, and an information processing system, all of which are operable to correct data acquired from an input device.

2. Description of the Background Art

Conventionally, an analog joystick or the like allows two dimensional input. That is, an analog joystick operation can cause two dimensional output. The respective dimensions of the output may be each multiplied by an individual predetermined constant to provide transformations that cause different input behaviors in the two respective directions (see, for example, Japanese Laid-Open Patent Publication No. 10-105328).

An input device, such as an analog joystick and an analog stick, is comprised of members, some of which can be displaced according to user operation thereon; and the displacement of the member(s) may include translation and rotation thereof. The input device will monitor the displacement of the member(s) and produce an output based on the monitored displacement for analog input to an information processing apparatus. The displaced member (hereinafter, referred to as movable member) has a limited range of its physically allowed displacement, hereafter referred to as range of displacement, for establishment of respective dimensions of its two dimensional input. Such range of displacement is due to physical constraints as hardware.

Therefore, an input device having small range of displacement as described above is faced with various problems associated with a desired output the device should provides, where the output can be an input to a information processing device utilizing the input device.

For example, when an input device is required to cover the greater range of output, it is desirable to utilize an input device capable of providing the greater range of physical displacement of its movable member(s), in that such device can easily attain a favorable operability. However, when an input device is required to have its size reduced, the device is associated with difficulty in keeping sufficient range of physical displacement of its movable member(s) or in making the range greater. In such a condition, the device is required to apply more limited range of the displacement to its desired range of output. This significantly deteriorates operability of the input device. In particular, when an user is forced to manipulate such a device for attaining a relatively small amount of displacement as compared to the upper limit of the range of displacement. the user has difficulty in establishing intended input operation.

SUMMARY

Therefore, it is expected to provide, for example, a computer-readable storage medium having stored therein an information processing program capable of realizing an improved operability even when an input device which is physically restricted as described above is used. p The present invention may be implemented as shown in the following exemplary aspects. Any of the specific descriptions as indicated below is illustrative for aiding in understanding an outline of the present invention, and is not intended to be limited thereto. Namely, it is understood that a person of ordinary skill in the art can implement the present invention in an equivalent range based on the specific description of the present invention and on the common technological knowledge.

In one aspect of the present invention, the invention is directed to a computer-readable storage medium having stored therein an information processing program executed by a computer of an information processing apparatus for correcting data outputted from an input device. The information processing program causes the computer to function as input data acquisition means and first input data updating means.

The input data acquisition means acquires, as object data, input data outputted from the input device. Further, the first input data updating means sequentially updates the object data, when the input data becomes equal to or greater than an upper limit defined by allowed range of input operation on the input device, until the updated object data indicates a predetermined value which is greater than the upper limit value.

As used herein, the term "allowed range of input operation" for an input device refers to a set of variable values or a set of combinations (or ordered pairs) of variable values that characterizes properties of the input device and is defined under the condition that the input operation can allow establishment of inputs through the device.

Further, the "upper limit value defined by the allowed range of the input operation" for input data refers to an upper limit value of a variable such as e.g., displacement, distance and coordinate when the variable is subject to a limitation from the device's properties, e, g., in case of an analog stick, an allowed range of displacement of its member(s). The upper limit value used herein may include not only an upper limit value obtained when numerical values are compared in consideration of signs attached thereto, but also an upper limit value obtained when the absolute values are compared, depending on the usage of the variable. Further, when the input data is a combination (or an ordered pair) of two or more components (numerical values), e.g. two-dimensional coordinate; "an upper limit value" for the input data may be defined as an input data set (i.e. a combination of components) which provides the upper limit value of a variable which is derived so as to represent a predetermined relationship between the components, for example, a distance between the origin and the point representing the two-dimensional coordinates.

In some cases, such a upper limit value may be identical to a raw upper limit value of output from physical input operation on the input device. However, in other cases, e.g. in a case of limitations arising from designs of an entire system in which the input device works; the upper limit value may not be identical to an raw upper limit value of output during physical input operation on the input device.

Examples of the latter cases include a case that an entire system, in which the input device works, determines a state of output within neighborhood of a upper limit value from an input operation on the input device, to be the state that the output equal to or greater than the upper limit value.

In an embodiment, the first input data updating means may update the object data such that the updated object data approaches the predetermined value greater than the upper limit value.

In an alternative embodiment, the first input data updating means may update the object data such that the updated object data approaches, by a predetermined amount, the predetermined value greater than the upper limit value.

In another embodiment, the first input data updating means may update the object data, in accordance with change per unit time, in an input-data derived amount, obtained when the input data becomes equal to or greater than an upper limit defined by allowed range of input operation on the input device.

In still another embodiment, the input data may indicate a position of a point which is displaced from a reference position which is set so as to correspond to a predetermined position in the input device.

In still another embodiment, the first input data updating means may update the object data, in accordance with a change, per unit time, in a distance between the position defined by the input data, and the origin, which is the reference position.

In another embodiment, the first input data updating means may update the object data, in accordance with a change, per unit time, in an amount derived from the input data, wherein the change per unit time is obtained through calculation of magnitude of a differential vector defined by position vectors representing the positions obtained at adjacent time points, one of which is the position defined by the input data.

In still another embodiment, the information processing program may cause the computer to further function as second input data updating means for sequentially updating the object data after an input data for the object data becomes equal to or greater than an upper limit defined by allowed range of input operation on the input device, the updating being performed such that the input data becomes equal to or greater than the upper limit immediately before another input data is inputted and, if the another input data is not equal to or less than the upper limit, the second input data updating means sequentially updates the object data from the predetermined value up to the upper limit.

In still another embodiment, the second input data updating means may update the object data such that a value of the object data approaches the upper limit value.

In still another embodiment, the second input data updating means may update the object data such that the value of the object data approaches, by a predetermined amount, the upper limit value.

In an embodiment, the second input data updating means may sequentially update the object data after the input data becomes equal to or greater than an upper limit defined by allowed range of input operation on the input device, the updating being performed such that the input data becomes equal to or greater than the upper limit immediately before the another input data is inputted and, if the another input data is not equal to or less than the upper limit, the second input data updating means sequentially updates the object data based on a change, per unit time, in an amount derived from the input data and/or another input data.

In an embodiment, when the input data is equal to or greater than an upper limit defined by allowed range of input operation on the input device, the first input data updating means may update the object data, based on a change, per unit time, in an amount derived from normalization of the input data, and the normalization is to multiply the input data by a predetermined value.

In an embodiment, the information processing program may cause the computer to further function as preliminary correction means for performing a clamping process for the input data before the input data acquisition means acquires the input data as the object data.

In an embodiment, the information processing program may cause the computer to further function as processing means for performing a predetermined process by using, as an input value, the object data having been sequentially updated by the first input data updating means.

In an embodiment, the information processing program may cause the computer to further function as processing means for performing a predetermined process by using, as an input value, the object data having been sequentially updated by the second input data updating means.

In an embodiment, the input data may be multi-dimensional data.

In other aspects of the present invention, the information processing program described above may be implemented in an information processing apparatus or an information processing system which executes the information processing program. Further, the present invention may be implemented as a method for performing information processing. In this case, the method can be executed by, for example, the information program, the information processing apparatus, and/or the information processing system as described above.

As used herein, the term "the computer-readable storage medium", represents, any device or medium which can store programs, codes, and/or data so as to allow a computer system to use the program, code, and/or data. The computer-readable storage medium may be volatile or non-volatile when the computer-readable storage medium can be read by a computer system. The computer-readable storage medium includes, but is not limited to, a magnetic tape, a hard disk drive (HDD), a compact disc (CD), a digital versatile disc (DVD), a Blu-ray (registered trademark) disc (BD), and a semiconductor memory, for example.

As used herein, the term "system" (for example, information processing system, game system), may represent, a single device or a plurality of devices each of which can communication with any one of the plurality of devices.

According to the present invention, for example, a computer-readable storage medium having stored therein the information processing program can provide a favorable controllability even when an input device has a physical restriction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram illustrating an internal configuration of the game apparatus 10;

DESCRIPTION OF THE EXAMPLE EMBODIMENTS

Exemplary Structure of Game Apparatus

Figure 1:
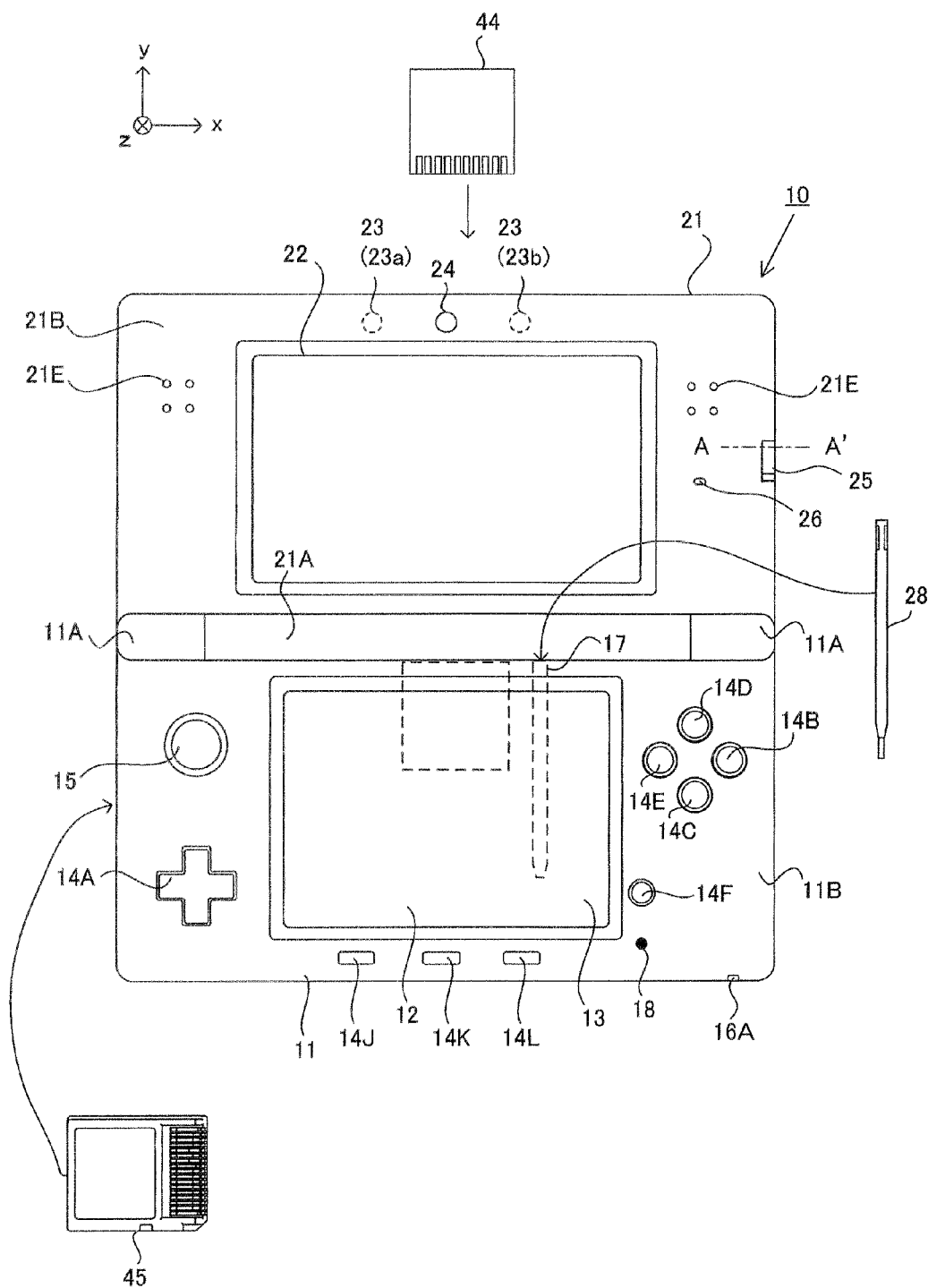
FIG. 1 is a front view of a game apparatus 10 in an opened state.
Figure 2:
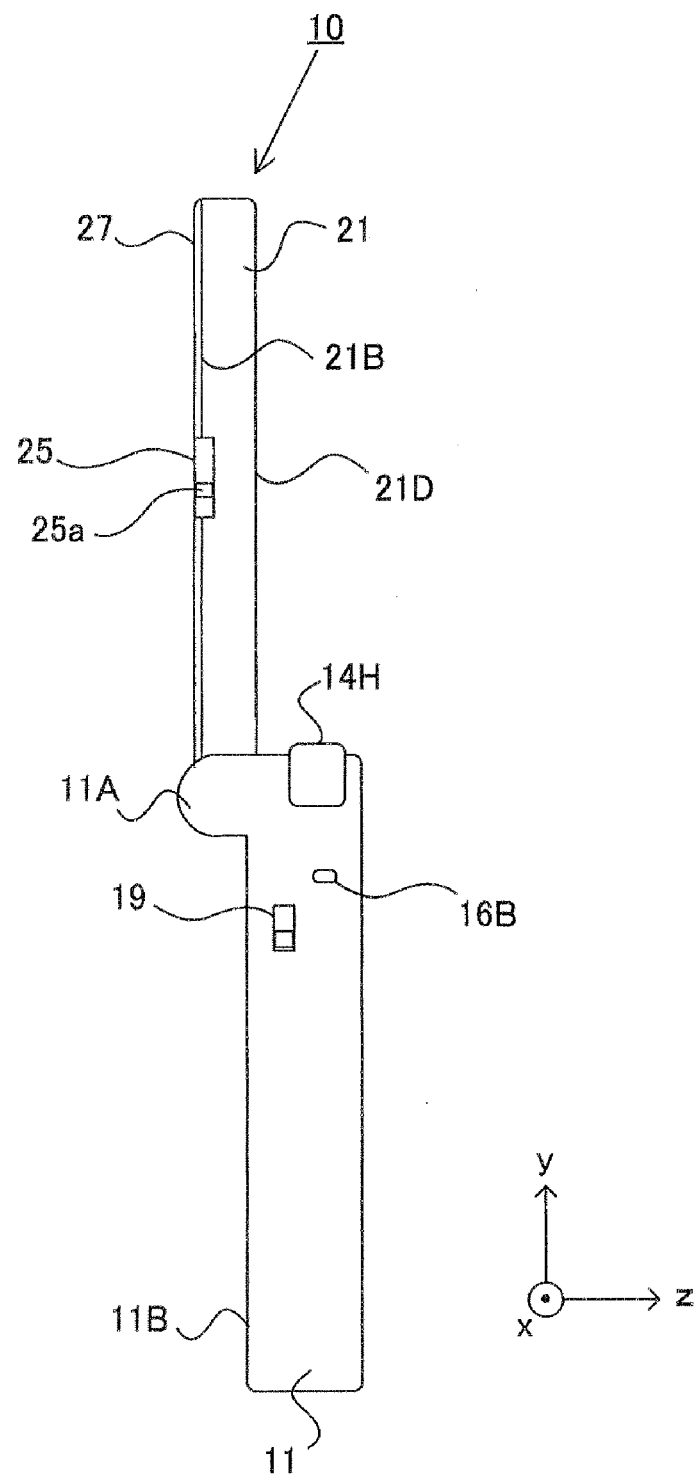
FIG. 2 is a side view of the game apparatus 10 in the opened state.
Figure 3:
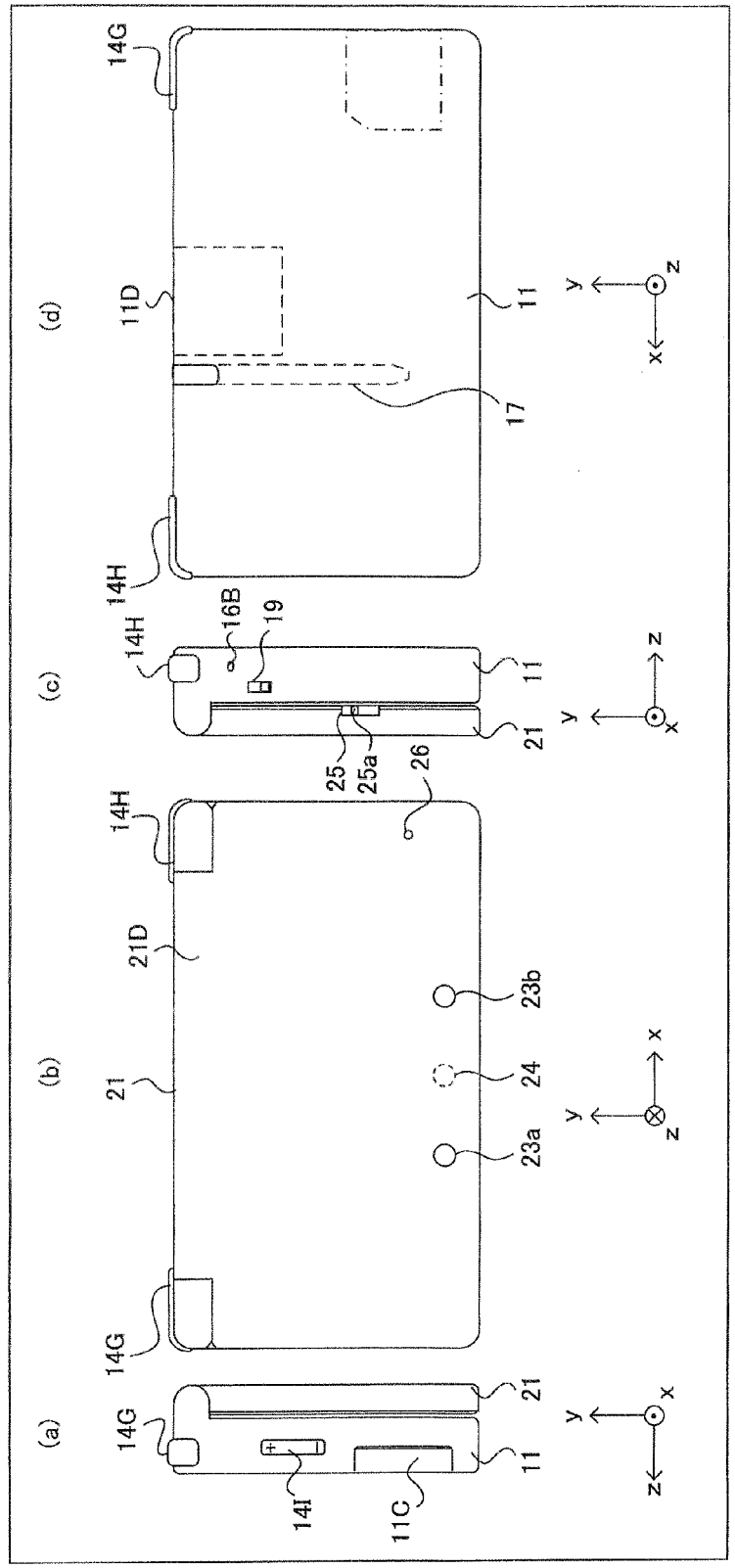
FIG. 3 is a left side view, a front view, a right side view, and a rear view of the game apparatus 10 in a closed state.

Hereinafter, a game apparatus according to an exemplary embodiment of the present invention will be described. FIGS. 1 to 3 are each a plan view of an outer appearance of a game apparatus 10. The game apparatus 10 is a hand-held game apparatus, and is configured to be foldable as shown in FIGS. 1 to 3. FIGS. 1 and 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 to 3. The game apparatus 10 includes a lower housing 11 and an upper housing 21 as shown in FIGS. 1 to 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIGS. 1 and 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIGS. 1 to 3, in the lower housing 11, a lower LCD (Liquid Crystal Display) 12, a touch panel 13, operation buttons 14A to 14L (FIGS. 1 and 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the horizontal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is a resistive film type touch panel.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a kind of input device which enables a direction input to be made. In the present embodiment, the analog stick 15 is provided to the left of the lower LCD 12 in an upper portion of the inner side surface of the lower housing 11. More specifically, as shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15.

The analog stick 15 has a key top which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the key top of the analog stick 15 slides.

The analog stick 15 may be structured such that, when the key top is moved from a reference position by a distance (within a predetermined range) in any direction (of all of 360 degrees) of the upward, the downward, the leftward, the rightward, and the diagonal directions, an analog input can be made. The analog stick 15 provides a two-dimensional output value in accordance with an input operation performed by a user on the key top by an amount in any direction. More specifically, a relative positional relationship between a default position of the key top and a position of the key top which is obtained through an operation on the key top is electrically recognized (by using, for example, a device, such as a potentiometer, for converting a movement amount to a voltage), and the result thereof is provided as the two-dimensional output value of the analog stick 15 (that is, the analog stick 15 is an input device which enables a two-dimensional input).

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 are disposed on opposite sides of the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 4) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11.

The L button 14G is positioned on the left end portion of the upper side surface of the lower housing 11 and the R button 14H is positioned on the right end portion of the upper side surface of the lower housing 11. The L button 14G and the R button 14H act as, for example, shutter buttons (imaging instruction buttons) of the imaging section. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3(d), an insertion opening 11D through which an external memory 44 having a game program stored therein is inserted into the game apparatus 10 is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIGS. 1 and 3(c), the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 to 3, in the upper housing 21, an upper LCD (Liquid Crystal Display) 22, an outer imaging section 23 (an outer imaging section (left) 23a and an outer imaging section (right) 23b), an inner imaging section 24, a 3D (three-dimensional) adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area.

The outer imaging section 23 is a generic term used to include two imaging sections 23a and 23b provided on the outer side surface 21D, which is one of opposite sides of the main surface of the upper housing 21, the other having the upper LCD 22 mounted thereon.

As indicated by dashed lines in FIG. 1 and by solid lines in FIG. 3(b), the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIGS. 1 and 3(b), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(b) represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the outer imaging section (left) 23a and the outer imaging section (right) 23b. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled.

Further, a speaker hole 21E is provided on the inner side surface of the upper housing 21.

(Internal Configuration of Game Apparatus 10)

Next, an internal electrical configuration of the game apparatus 10 will be described with reference to FIG. 4. FIG. 4 is a block diagram illustrating an internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, to perform a process (for example, imaging process or a game process described below) based on the program. The program executed by the CPU 311 of the information processing section 31 may be acquired from another device through communication with the other device. The information processing section 31 includes a VRAM (Video RAM) 313. The GPU 312 of the information processing section 31 generates an image in accordance with an instruction from the CPU 311, and renders the image rendered in the VRAM 313. The GPU 312 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is non-volatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(An Overview of Behavior of Input Value Correction Processing Program)

The following describes an overview of behavior of the input value correction processing program 71 (see the memory map shown in FIG. 7) according to an embodiment of the present invention. In this embodiment, the analog stick 15 is an input device for providing inputs in a game process executed by a game program 70. The inputs provided by the analog stick 15 in the game process are corrected, by implementing a function of the input value correction processing program 71, to generate corrected input values. The game program 70 uses the corrected values to perform the game process.

An overview of behavior and the like of the input value correction processing program 71 will now be described with reference to FIGS. 5A to 5C.

(Range of Displacement of Key Top, Input Operation and Output Dependent Thereon)

The relationship will be now briefly described between a range of displacement of a key top of the analog stick 15, and an output dependent on input operation thereon. Then, we will describe the overview of behavior and the like of the input value correction processing program 71.

Figure 5A:
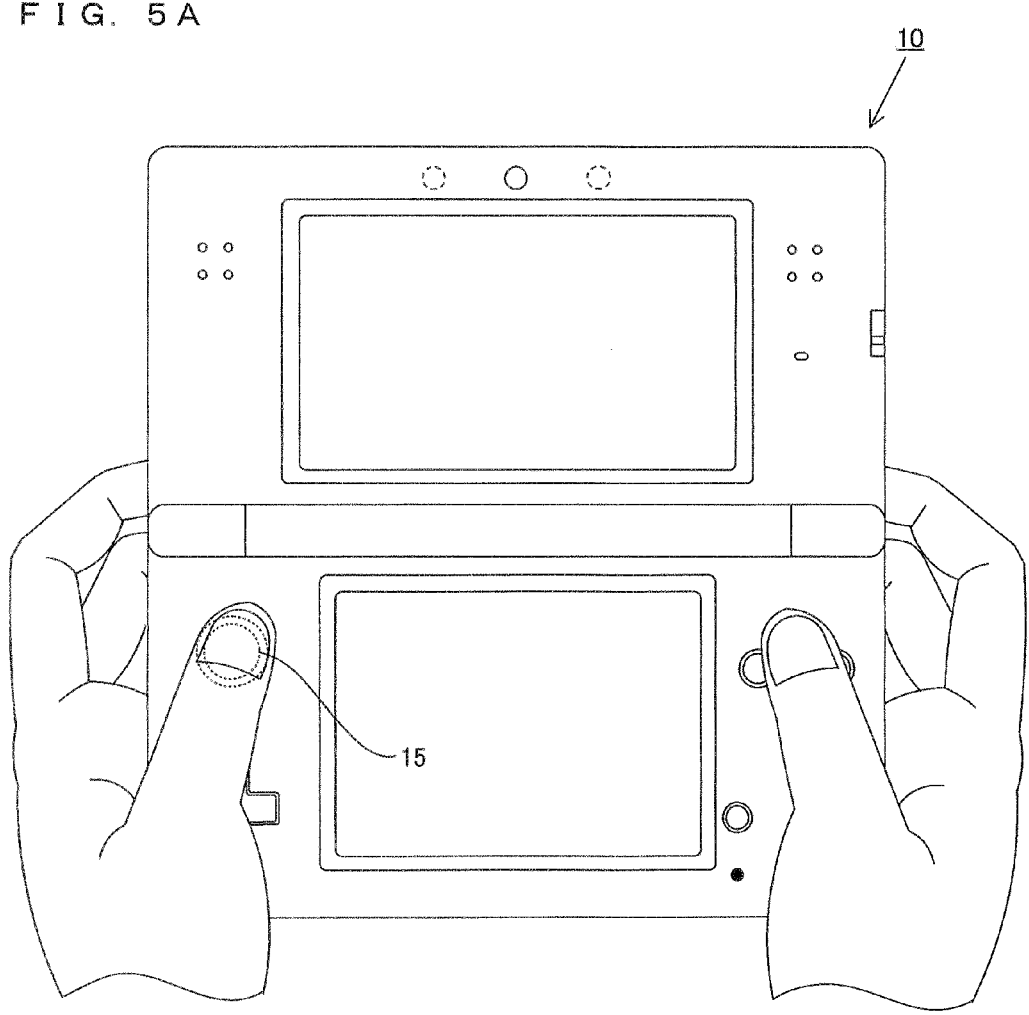
FIG. 5A is a schematic diagram illustrating an exemplary operation performed on an analog stick 15.

FIG. 5A shows an exemplary operation performed on the analog stick 15. The analog stick 15 provides output values, which are in two-dimensional data format, in response to an arbitrary amount in displacement of the key top of the analog stick 15 in an arbitrary direction. More specifically, the analog stick 15 detects the key top displaced from its default position to obtain the amount of the displacement, thereby generating output values in two-dimensional data format in accordance with the displacement amount.

Figure 5B:
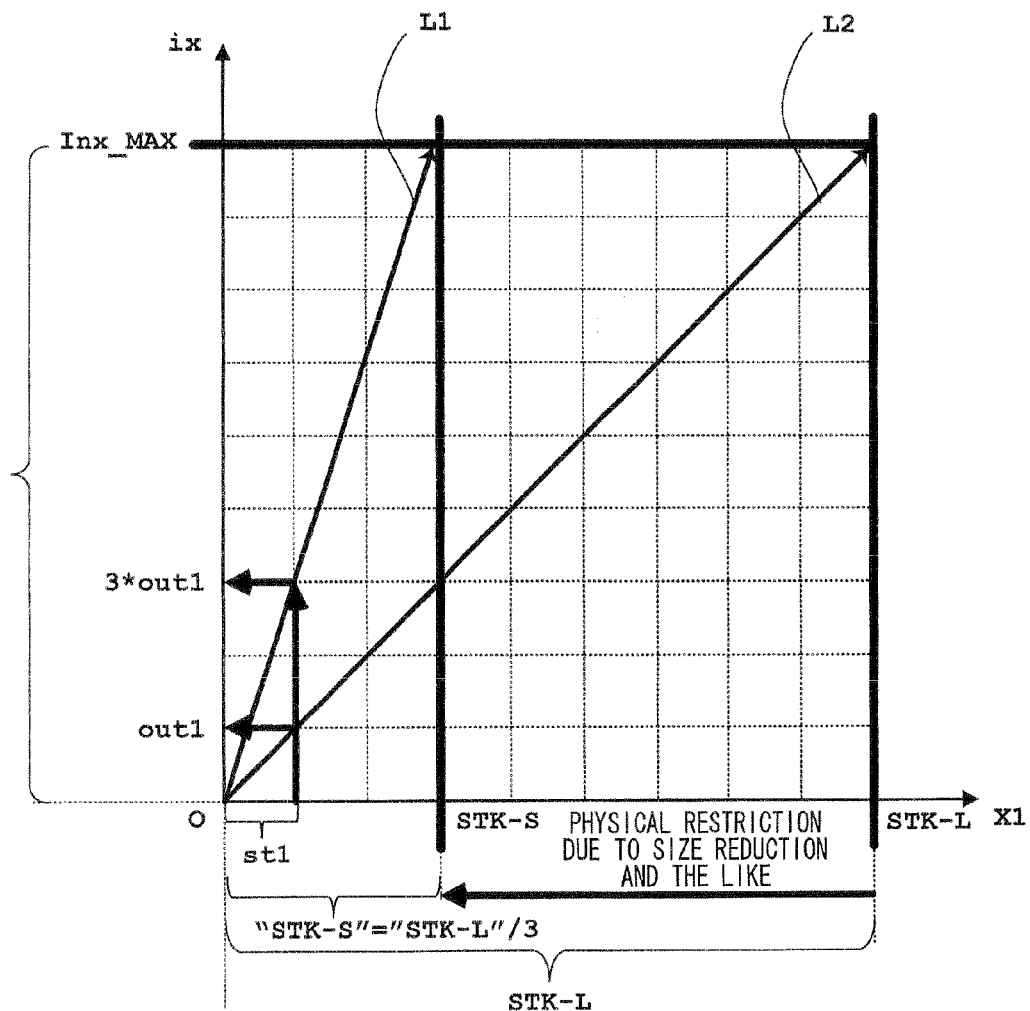
FIG. 5B is a schematic diagram illustrating a relationship between the range of displacement of the analog stick 15's member (key top) in response to input operation thereto, and a range of values outputted by the analog stick 15 in accordance with the input operation thereon.

FIG. 5B is a schematic diagram illustrating a relationship between the range of displacement of the member (key top) of analog stick 15 in response to input operation thereto, and a range of values outputted by the analog stick 15 in accordance with the input operation thereon. The analog stick 15 detects a relative positional relationship between two positions the key top can occupy, one of which is its default position and another is a position obtained in response to an operation on the key top. Then, the analog stick 15 detects the amount of displacement based on the positional relationship, thereby generating an two-dimensional output set of values, corresponding to the displacement amount. FIG. 5B shows a case without processing by the input value correction processing program according to an embodiment of the present invention.

As described above, the analog stick 15 is a device which allows a two-dimensional input. The two-dimensional data obtained through the input is represented as (ix, iy). If an explanation is given of one component, the similar applies to another; because of similarity in handling them. Then, the component ix will be now described in more detail. Cases in which components ix and iy share a relationship between them will be described later.

The horizontal axis shown in the schematic diagram of FIG. 5B represents a displacement of the key top (in this case, distance X1 from the default position to the displaced key top) in response to an input operation on the key top; and the displacement is used to determine component ix. The similar applies to the relationship between two variables, the corresponding displacement Y1 and component iy. The key top of the analog stick 15 is movable over a distance STK-S from the default position in accordance with an input operation. On the other hand, the vertical axis shown in the schematic diagram of FIG. 5B represents a variable (ix) to be outputted by the analog stick 15 in accordance with an operation on the key top. The variable ix ranges from the lower limit value, i.e. 0, to the upper limit value, i.e. Inx_MAX. As indicated above the key top is displaced from its default position, and the amount of displacement is expressed in distance. However, such an amount may also be represented in other variables such as in an angle.

Line L1 schematically represents a relationship between a displacement (X1) from the default position of the key top of the analog stick 15, and a value (ix) outputted in accordance with the displacement. Linearity in the parameters, the displacement (X1) and the variable (ix), is expressed for illustrative purposes. However, such linearity is not necessarily required. As is apparent from FIG. 5B, the component ix represents a value (ix) within a predetermined range ($0 \leq ix \leq Inx\_MAX$), dependent on the displacement X1 ($0 \leq 1 \leq STK-S$) from the default position, in the input operation on the key top.

FIG. 5B also illustrates, for comparison, another example where the variable ix is outputted to be within the same range ($0 \leq ix \leq Inx\_MAX$) but a distance which the key top is allowed to be displaced is greater than the distance STK-S. In this example, the upper limit value of the displacement is depicted as STK-L. Specifically, this figure illustrates, for comparison, the example that the distance which the key top is allowed to be displaced is approximately three times greater than the distance STK-S. In this example, Line L2 represents the relationship between displacement X1 and the value (ix) outputted dependent on the displacement.

If the two examples represented by Lines L1 and L2 are compared to each other, it can be easily understood that the smaller range of the displacement is likely to be associated with the more adverse effect, in aim of outputting the variable ix to be within the same range ($0 \leq ix \leq Inx\_MAX$).

In the example represented by Line L2, user's operation in ac displacement X1 ranging from 0 to st1 (st1$\leq$STK-S) generates a corresponding value ix ranging from 0 to out1. On the other hand, in the example represented by L1, when X1 indicates st1, the component ix indicates a value which is three times greater than the value out1. As understood from these examples, an drive for device miniaturization or the like forces the necessity to reduce the range of displacement of the key top of the analog stick 15; the more reduced range of displacement causes the device to make a more abrupt response to operation thereon. Thus, the reduced range of displacement makes it difficult to operate the device in minute detail.

(Processing by Input Value Correction Processing Program)

Figure 5C:
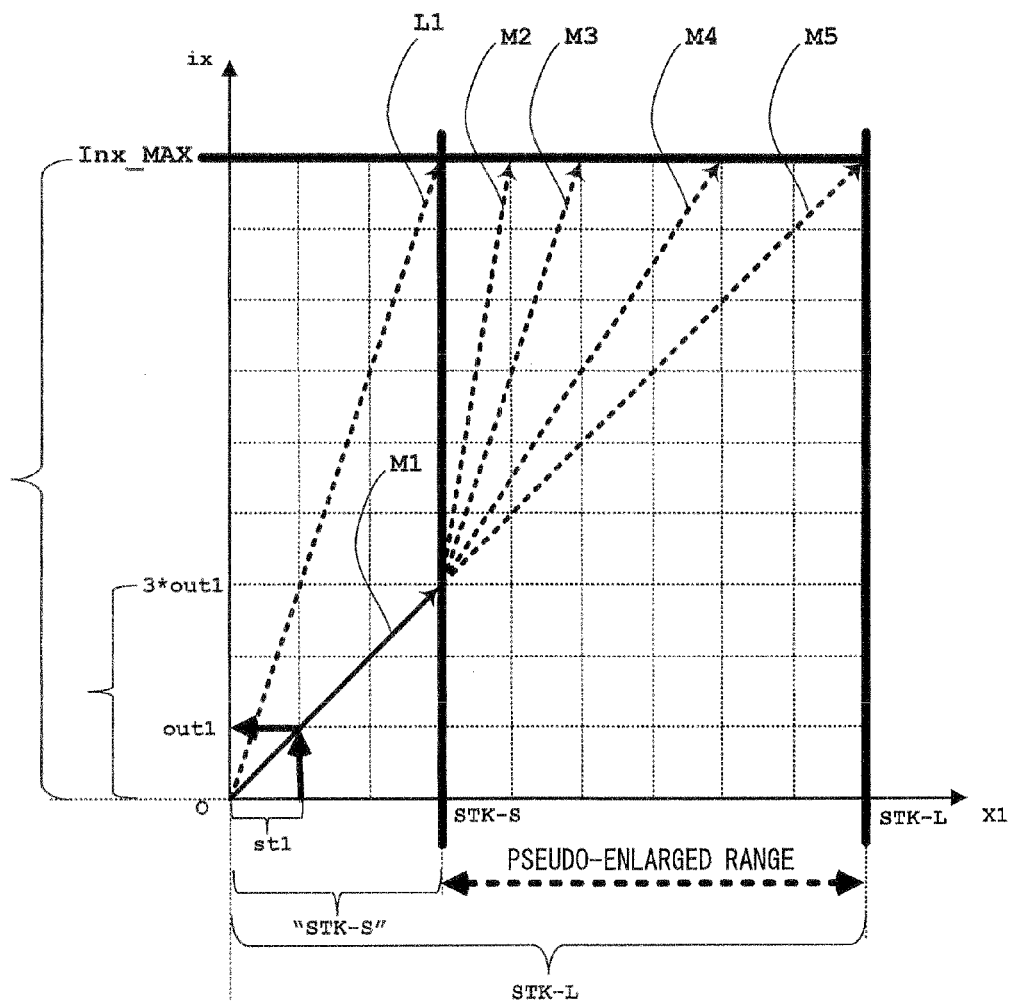
FIG. 5C is a diagram illustrating an exemplary relationship between a range of displacement of the key top of the analog stick 15, and a range of the value (ix) to be outputted by the analog stick 15 in accordance with an input operation thereon, where the range of displacement is pseudo-enlarged by executing the input value correction processing program 71 according to an embodiment of the present invention.

The following describes, with reference to FIG. 5C, an overview of behavior of an exemplary embodiment of the present invention, that is, the input value correction processing program 71, and increased operability of the analog stick 15, which is provided by the program.

FIG. 5C is a diagram illustrating an exemplary relationship between a range of displacement (X1) of the key top of the analog stick 15, and a range of the value (ix) to be outputted by the analog stick 15 in accordance with an input operation thereon, where the range of displacement is pseudo-enlarged by executing the input value correction processing program 71 according to an embodiment of the present invention.

In the exemplary embodiment, the range of displacement of the analog stick 15's key top ranges from 0 to STK-S. A case will be described in which, when the component ix represents a value within a predetermined range ($0 \leq ix \leq Inx\_MAX$), the range of the displacement of the key top is pseudo-enlarged, in accordance with the analog stick 15 being operated, by execution of the input value correction processing program 71.

In this exemplary case, the input value correction processing program 71 operates such that, when X1 ranging from 0 to STK-S is provided in accordance with the analog stick 15 being operated, the component ix is provided so as to satisfy a relationship represented by line M1. Line M1 almost corresponds to the line L2 shown in FIG. 5B. Specifically, even when the range of displacement of the key top of the analog stick 15 is restricted to the range from 0 to STK-S, the component ix is determined dependent on the displacement X1 so as to satisfy a relationship equivalent to that for a case where the range of displacement is provided to be that from 0 to STK-L. Namely, unlike line L1 shown in FIG. 5B, the component ix to be outputted does not abruptly respond to the displacement X1. This can also be understood from FIG. 5C which shows that, when the displacement X1 indicates STK-S, the analog stick 15 provides 3×out1 as the component ix.

On the other hand, the input value correction processing program 71 operates as follows for the component ix indicating a value ranging from 3×out1 to Inx_MAX. Specifically, the input value correction processing program 71 utilizes a rate; i.e. a change, per unit time, in an amount by which the key top is displaced (displacement of the key top), which is obtained when an operation on the key top of the analog stick 15 causes the displacement X1 to reach STK-S.

More specifically, the input value correction processing program 71 operates such that the higher change per unit time in displacement of the key top is given, the greater the resultant component ix is provided to be. In FIG. 5C, the component ix ranging from 3×out1 to Inx_MAX is provided in accordance with a change per unit time in a displacement of the key top when the displacement X1 becomes STK-S or greater.

Specifically, as indicated as lines (dotted lines) M2 to M5 shown in FIG. 5C, a path by which the component ix reaches Inx_MAX is different in accordance with the rate obtained when the displacement X1 reaches the upper limit value STK-S. That is, the input value correction processing program 71 establishes a behavior that the faster its user operates the analog stick 15, the faster the component ix reaches Inx_MAX; specifically, for example a behavior represented by M2 in an example shown in FIG. 5C.

As is apparent from the above description, the input value correction processing program 71 can provide a favorable operability of the analog stick 15, with which to operate the device in minute detail even when the range of displacement is narrow while providing favorable responsiveness in an output from the analog stick 15 in accordance with an input operation thereon. In this regard, such an operability allows user's intended operation even when the user makes an input by a small displacement relative to the upper limit of the range of displacement.

The relationship between the displacement X1 and the component ix has been mainly described. As described above, the analog stick 15 is an input device which allows the two-dimensional input, and the two-dimensional data obtained from the input is represented as (ix, iy). Hereinafter, The following describes in detail, with reference to FIG. 6, a process executed by the input value correction processing program 71 for correcting the two-dimensional data (ix, iy) that is determined according to the allowed range of displacement in the analog stick 15 defined as (X1, Y1).

Figure 6:
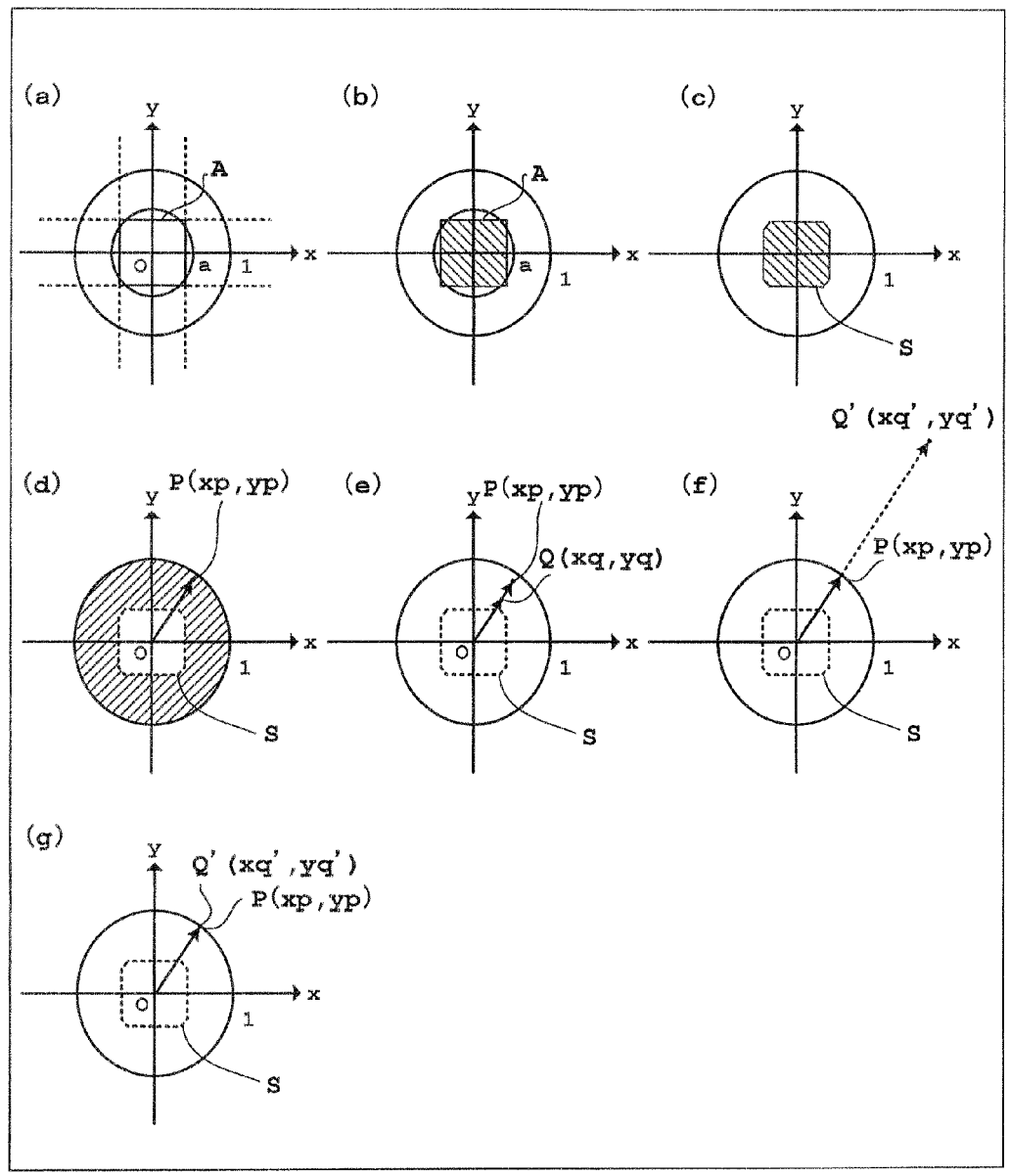
FIG. 6 shows graphs for illustrating corrected values, which the input value correction processing program 71 according to an embodiment of the present invention generates from input data that the analog stick 15 feeds in two-dimensional input format.

FIG. 6 shows graphs for illustrating corrected values, which the input value correction processing program 71 according to an embodiment of the present invention generates from input data that the analog stick 15 feeds in two-dimensional input format.

In FIG. 6, an xy-plane is used as a plane for plotting the two-dimensional data (ix, iy) which is outputted in accordance with an input operation on the analog stick 15. Two circles in the xy-plane are drawn in each of (a) to (g) of FIG. 6, and the two circles share the same center on the origin in the plane. The outer circle defines boundary of a region where (ix, iy) can be located, which is a ordered pair of values outputted in accordance with input operation on the analog stick 15. In this regard, each of the components of two-dimensional data (ix, iy) obtained from the analog stick 15 is normalized to range of 0 to 1. Therefore, the radius of the outer circle is depicted as one (1). Further, the obtained data may not necessarily undergo such normalization.

On the other hand, the inner circle is used for defining a region where (ix, iy) can be located, which is a combination of values outputted in accordance with input operation on the analog stick 15; and (ix, iy) in this region will be regarded as (0, 0) regardless of the actually obtained combination of values. The inner circle can be used alone for such purpose, however, in an exemplary embodiment, an overlapping part of the inner circle and a predetermined region can be used for defining a region in which (ix, iy) will be regarded as (0, 0) regardless of its combination of values actually obtained in accordance with the input operation.

More specifically, as shown in FIG. 6(a), the input value correction processing program 71 operates such that the predetermined region is defined to be square A which is an overlapping part of two regions. One of the two regions is the region between two lines symmetry with respect to x-axis, and another is the region between two lines symmetrical with respect to y-axis. That is, the overlapping part (hereinafter, referred to as a region S; see FIG. 6(c)) of the inner circle having radius of a (a<1) and the square A can be used for defining a region in which (ix, iy) will be regarded as (0, 0) regardless of its combination of values actually obtained in accordance with the input operation.

The following descriptions sum up the relationship between the contents of FIGS. 6 and 5C.

In the example shown in FIG. 5C, the input value correction processing program 71 operates such that, when the displacement X1 ranging from 0 to STK-S is given in accordance with an operation on the analog stick 15, the corresponding component ix is provided as illustrated by Line M1 indicating the relationship between X1 and ix. Similarly, in the analog stick 15, a displacement Y1 is given together with a displacement X1, and is allowed to be a value within a predetermined range. This Y1 determines its corresponding component iy.

FIG. 6(d) shows an exemplary region (the shaded region) in the xy-plane, on which the two-dimensional data (ix, iy) can lie. When the analog stick 15 provides, as the two-dimensional data (ix, iy), two-dimensional data corresponding to a point P(xp, yp) within the shaded region shown in FIG. 6(d), the input value correction processing program 71 operates so as to perform a predetermined process for transformation that moves the point P(xp, yp) to a point Q(xq, yq). The point Q(xq, yq) will be described below in detail. Specifically, an exemplary relationship between the point P(xp, yp) and the point Q(xq, yq) is as shown in, for example, FIG. 6(e).

The relationship will be more specifically described. When the input value correction processing program 71 is not executed, the component ix is determined according to displacement X1 of the key top of the analog stick 15 so as to satisfy, for example, the relationship therebetween represented by the line L1 shown in FIG. 5B. In addition, the similar applies to the relationship between the displacement Y1 and the component iy. On the other hand, when the input value correction processing program 71 is executed, the component ix is determined according to displacement X1 of the key top of the analog stick 15 so as to satisfy, for example, the relationship therebetween represented by the line M1 shown in FIG. 5C. In the above example, the transformation that moves the point P (xp, yp) to the point Q (xq, yq), corresponds to altering the relationship between displacement X1 and component ix. Specifically, the altering is to change the relationship from that represented by Line L1 to that represented by Line M1. The similar applies to the relationship between displacement Y1 and the component iy.

As shown in FIG. 6(f), when the two-dimensional data (ix, iy) obtained from the analog stick 15 becomes the point P (xp, yp) on the boundary of the outer circle, the input value correction processing program 71 obtains predetermined parameters dependent on the rate, i.e., the change in the displacement per unit time, at the obtainment of the point P(xp, yp) on or outside the boundary. The aforementioned transformation from point P to point Q is performed by using the predetermined parameters; and the transformation is followed by an additional processing of the resultant point to obtain point Q' (xq', yq'), which can be located on xy-plane. In an exemplary embodiment, the additional processing is to apply arbitrary adjustment parameters to the point Q so as to clamp the resultant point Q' (xq', yq') within a predetermined range. Specifically, the input value correction processing program 71 operates to additionally transform the Q' corresponding to the position as shown in FIG. 6(f), to Q' that is located inside the outer circle of radius 1 as shown in FIG. 6(g), by using the adjustment parameters. Thus, the input value correction processing program 71 improves operability and responsiveness of the analog stick. The additional transformation may be incorporated to the previous one, and the transformation from the point P(xp, yp) to the point Q'(xq', yq') as a whole may be performed at one time. Specific examples of a series of process steps as illustrated above will be described below.

(Memory Map)

Figure 7:
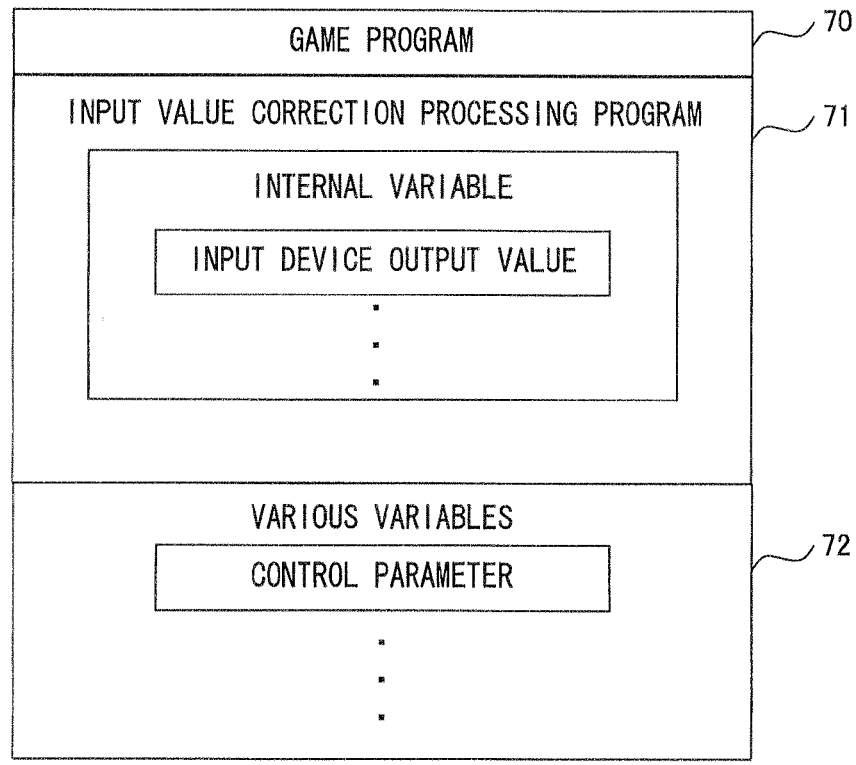
FIG. 7 is a diagram illustrating a memory map in a main memory 32 of the game apparatus 10.

First, main data stored in the main memory 32 during execution of the game program will be described. FIG. 7 is a diagram illustrating a memory map in the main memory 32 of the game apparatus 10. As shown in FIG. 7, the main memory 32 stores the game program 70, the input value correction processing program 71, various variables 72, and the like. In the present embodiment, the input value correction processing program 71 cooperates with the game program 70, and performs a process based on a request from the game program 70. However, execution of the input value correction processing program 71 is not limited to this example. For example, the input value correction processing program 71 may cooperate with an application program other than a game program, or may perform a process based on a request from the game program 70.

The game program 70 is a program for causing the information processing section 31 to execute a series of information processes including a game process which is a main process.

The input value correction processing program 71 is a program for causing the information processing section 31 to execute an input value correction process. The input value correction processing program 71 may include input device output values and the like as internal variables. A portion of the internal variables may be defined as various variables 72 described below, and may be stored in a region other than the region that stores the input value correction processing program 71.

The various variables 72 are variables used when the game program 70 or the input value correction processing program 71 is executed.

When the game apparatus 10 is powered on, the information processing section 31 (the CPU 311) of the game apparatus 10 executes a start-up program stored in a ROM which is not shown in the Drawing, thereby initializing the respective units such as the main memory 32. Next, the game program stored in the internal data storage memory 35 is loaded to the main memory 32, and CPU 311 of the information processing section 31 starts the execution of the game program.

Figure 8A:
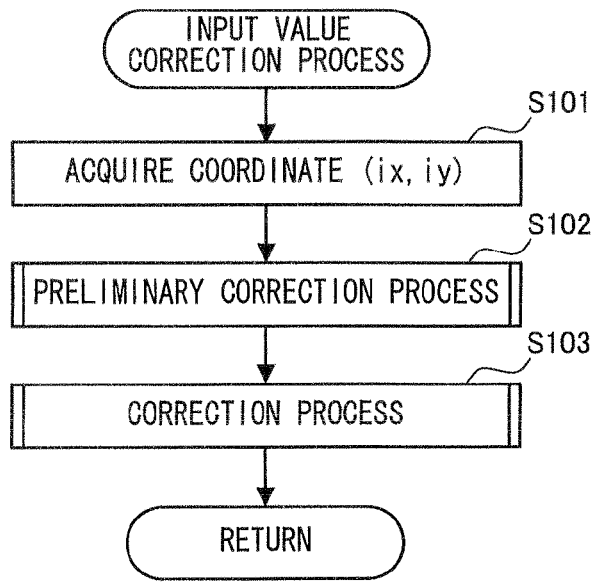
FIG. 8A is a diagram illustrating an exemplary main flow of an input value correction process according to an exemplary embodiment of the present invention.
Figure 8B:
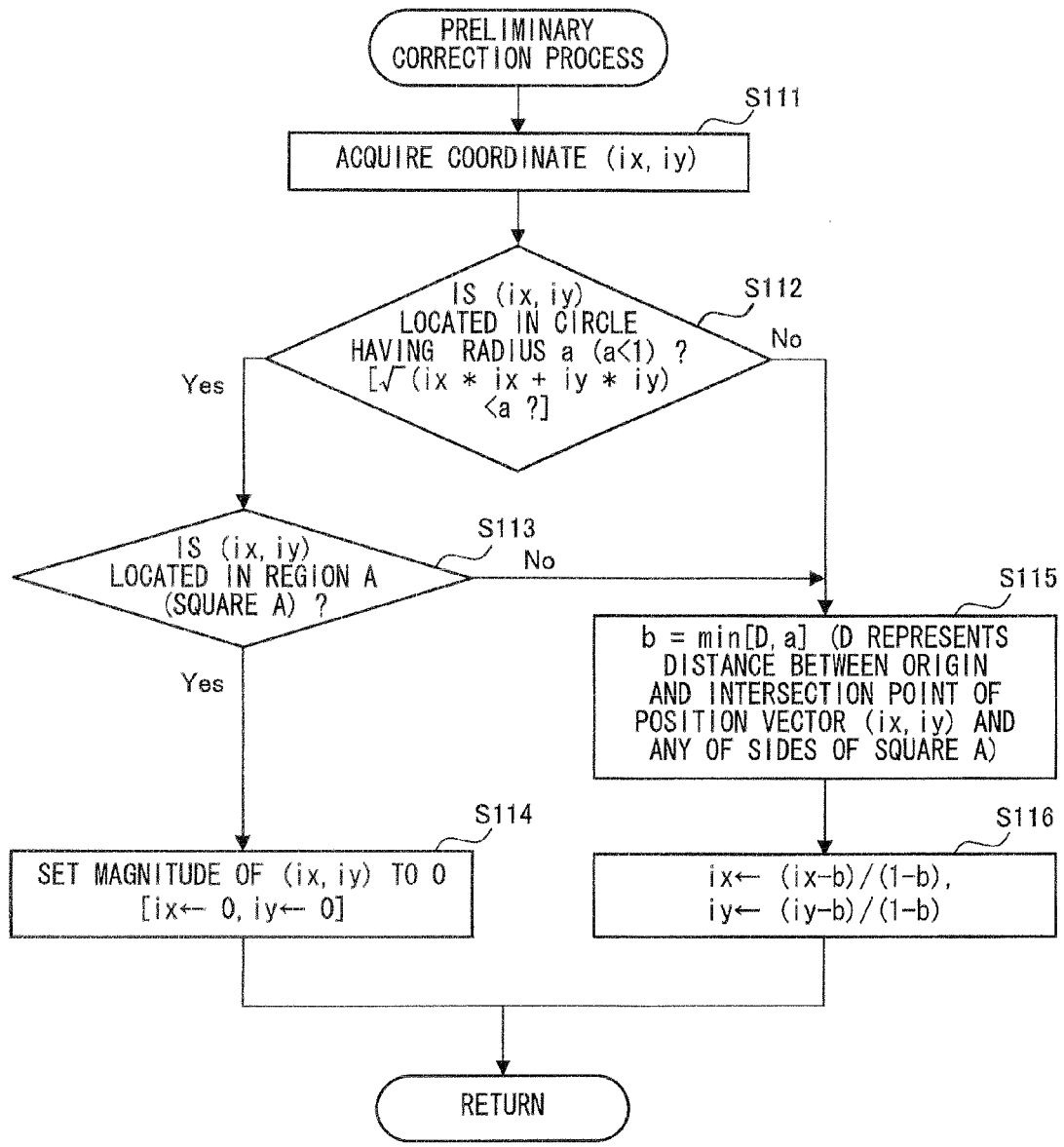
FIG. 8B is a flowchart showing an exemplary flow of a preliminary correction process.
Figure 8C:
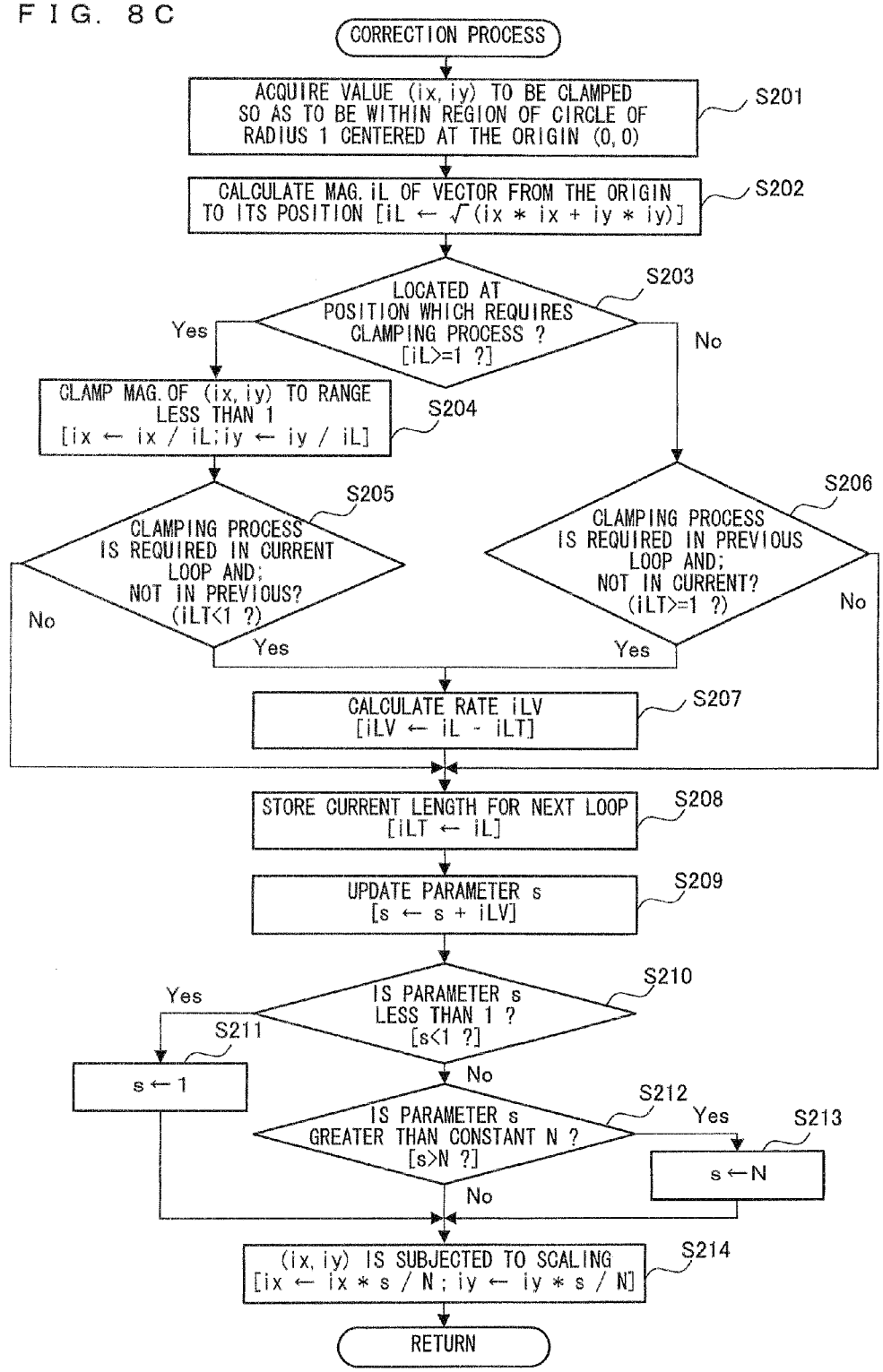
FIG. 8C is a flowchart illustrating an exemplary flow of the input value correction process.

Hereinafter, a flow of processing executed based on a series of information processing programs will be described with reference to flowcharts of FIGS. 8A to 8C. In FIGS. 8A to 8C, "step" is abbreviated as "S". The flowcharts of FIGS. 8A to 8C merely illustrate examples of possessing procedures. Therefore, the order of the processing steps may be changed as long as the same result is obtained. In addition, values of the variables, and threshold values used in determination steps are merely examples. Other values may be used as necessary. In the present embodiment, CPU 311 executes processing in all the process steps of each flowcharts of FIGS. 8A to 8C However, a processor or a dedicated circuit other than the CPU 311 may execute processing in a portion of the process steps of the flowcharts of FIGS. 8A to 8C.

(Input Value Correction Process)

The analog stick 15 outputs the two-dimensional data (ix, iy) in accordance with an input operation thereon. Then, the CPU 311 of the game apparatus 10 receives the two-dimensional data from the analog stick 15 at a specified time interval, the minimum unit of which is referred to as "unit time" in a processing of the input value correction as described in detail. Further, in the following example, the CPU 311 sequentially acquires the two-dimensional data from the analog stick 15 every unit time. The "current" (two-dimensional) data herein refers to that which is subjected to the ongoing processing the CPU 311 performs at a specific time point. In this regard, the "previous" (two-dimensional) data is that which is acquired at the time point preceding, by an unit time, the current time point.

FIGS. 8A to 8C are flowcharts showing a flow of the input value correction process for processing primary data acquired from the analog stick 15.

FIG. 8A shows a main flowchart of the input value correction process. As will become apparent below, the following variables are initialized before the start of the input value correction processing. Specific conditions of frequency and timing of the initialization may be modified according to specifications of the game apparatus 10. A distance iLT represents magnitude of a two-dimensional vector representing a "previous" two-dimensional data (ix, iy); and the iLT is initialized to be 0 (iLT=0). A rate iLV is defined as a subtraction of magnitude (iLT) of a previous two-dimensional data (ix, iy) from magnitude of the corresponding current two-dimensional data (ix, iy). The rate iLV is also initialized to be 0 (iLV=0). Further, a control parameter s is initialized as 1 (s=1). An adjustment parameter N is initialized so as to represent an arbitrary real number. The adjustment parameter N is a parameter for adjusting the degree of pseudo-enlargement of a range of displacement of the key top.

In step 101, the CPU 311 acquires the two-dimensional data (ix, iy) from the analog stick 15 in accordance with an input operation thereon.

In step 102, the CPU 311 performs a preliminary correction process. Specifically, the process steps of step 102 are performed as shown in the flowchart of FIG. 8B. The preliminary correction process will be described in detail below. In the preliminary correction process, the two-dimensional data (ix, iy) provided by the analog stick 15 in accordance with the input operation thereon is preliminarily corrected, and the two-dimensional data (ix, iy) is updated so as to represent the resultant values obtained through the preliminary correction. The preliminary correction process may not be performed in the input value correction process.

In step 103, the CPU 311 performs a correction process on the two-dimensional data (ix, iy) having been subjected to the preliminary correction process. The correction process will be described below in detail. Data which has been finally obtained through the correction process is used as an input value by the game program 70.

The following describes in detail, with reference to FIG. 8B, the steps of preliminary correction process (step 102), which the CPU 311 performs after it obtains in step 101 the two-dimensional data (ix, iy) in accordance with the input operation on the analog stick 15. FIG. 8B is a flowchart showing a flow of the preliminary correction process.

In step 111, the CPU 311 acquires the two-dimensional data (ix, iy) from the analog stick 15 in accordance with the input operation thereon. Thereafter, the CPU 311 advances the process to step 112.

A series of process steps, that is, Steps 112 to 116, represents a process that the CPU 311 determines a combination (or an ordered pair) of values, i.e. (ix, iy) to be (0, 0) in the case that the combination satisfies a predetermined condition when it is outputted from the analog stick 15 in accordance with the input operation thereon. Specifically, the following process steps are performed.

In step 112, the CPU 311 determines whether or not the two-dimensional data (ix, iy) plotted on xy-plane is located within the area of the circle of radius a (a<1) centered at the origin (0, 0) (see FIG. 6(a)), when the two-dimensional data (ix, iy) is outputted from the analog stick 15 in accordance with the input operation thereon.

When the CPU 311 determines in step 112 that the two-dimensional data (ix, iy) satisfies the condition described above (Yes in step 112), the CPU 311 advances the process to step 113. On the other hand, when the CPU 311 determines that the two-dimensional data (ix, iy) does not satisfy the condition described above (No in step 112), the CPU 311 advances the process to step 115.

In step 113, the CPU 311 determines whether or not the two-dimensional data (ix, iy) described above is located within the square A. Eventually, the CPU 311 determines, in the previous and the current steps (steps 112 and 113), whether or not the point (ix, iy) is within the region S shown in FIG. 6(c). When the CPU 311 determines, in step 113, that the two-dimensional data (ix, iy) satisfies the condition described above (Yes in step 113), the CPU 311 advances the process to step 114. On the other hand, when the CPU 311 determines that the two-dimensional data (ix, iy) does not satisfy the condition described above (No in step 113), the CPU 311 advances the process to step 115.

In step 114, the CPU 311 updates the current two-dimensional data (ix, iy) so as to be (0, 0).

In step 115, the CPU 311 calculates a distance (hereinafter, referred to as a distance D) between the origin and an intersection point at which a position vector (ix, iy) intersects any of sides of the square A, and compares the distance D with the radius a of the circle described above. Then, the CPU 311 stores a smaller one of the calculated value D and the radius a, as a variable b (b=min[D, a]).

In step 116, the CPU 311 updates (ix, iy) by using the value b calculated in step 115. Specifically, the CPU 311 calculates {(ix−b)/(1−b)} and {(iy−b)/(1−b)}, and stores a combination of these two values, as the current (ix, iy).

Then, the CPU 311 is able to generate output values, through the calculations in steps 115 and 116, from the input operation, allowing for natural-seeming behavior.

The following describes in detail, with reference to FIG. 8C, the steps of the correction process (step 103), which the CPU 311 performs after it executes the preliminary correction process in step 102. FIG. 8C is a flowchart showing a flow of the correction process.

In step 201, the CPU 311 acquires (ix, iy) which represents a result of the preliminary correction process (step 102). When the resultant data (ix, iy) satisfies predetermined conditions defined in the subsequent steps, the ordered pair (ix, iy) is clamped so as to be within the region of the circle of radius one (1) centered at the origin (0, 0) (see FIG. 6).

In step 202, the CPU 311 processes the two-dimensional data (ix, iy) as a two-dimensional vector, and calculates a magnitude (iL) of the vector. Specifically, the CPU 311 obtains the magnitude of the vector (ix, iy) by calculating the positive square root (principal square root) of $(ix^2+iy^2)$. This corresponds to the calculation of the distance iL between the origin (0, 0) and the point P (ix, iy) on the xy-plane.

In step 203, the CPU 311 determines whether or not the distance iL is greater than or equal to 1. Specifically, the CPU 311 determines whether the point (ix, iy) in the xy-plane corresponding to the object data lies in a region outside the circle of radius one (i) centered at the origin (0, 0), or the point (ix, iy) is in a region inside the circle. When the CPU 311 determines that the point (ix, iy) on the xy-plane is in the region outside the circle of radius one (1) centered at the origin (0, 0) (Yes in step 203), the CPU 311 advances the process to step 204. On the other hand, when the CPU 311 determines that the point (ix, iy) on the xy-plane is in the region inside the circle (No in step 203), the CPU 311 advances the process to step 206.

In step 204, the CPU 311 performs a process for clamping the magnitude of the vector (ix, iy) to a range less than 1. In other words, the CPU 311 performs the process according to a series of steps 202-204, that is, the process (clamping process) for clamping the (ix, iy) obtained in step 201 to a predetermined range (that is, the range where the magnitude of the two-dimensional vector is less than or equal to 1). Specifically, the CPU 311 divides each of the components ix and iy by iL, and updates (ix, iy) so as to be the resultant values.

In step 205, the CPU 311 determines whether or not the distance (iLT) is less than 1. The distance iLT has been calculated from the previous two-dimensional data obtained from the analog stick 15. That is, the CPU 311 determines whether or not the previous two-dimensional data, among a series of the two-dimensional data (ix, iy) sequentially obtained from the analog stick 15, has been subjected to the clamping process in steps 202 to 204, in order to determine whether or not it is the current time point that the two-dimensional data becomes data representing a point located on a position which should be subject to the clamping process. Specifically, when the CPU 311 determines that the distance iLT is less than 1 (Yes in step 205), the CPU 311 advances the process to step 207. On the other hand, when the CPU 311 determines that the distance iLT is greater than or equal to 1 (No in step 205), the CPU 311 advances the process to step 208.

In step 206, the CPU 311 determines whether or not the distance (iLT) is greater than or equal to 1. The distance iLT has been calculated from the previous two-dimensional data obtained from the analog stick 15. That is, the CPU 311 determines whether or not the previous two-dimensional data, among a series of the two-dimensional data (ix, iy) sequentially obtained from the analog stick 15, has been subjected to the clamping process in steps 202 to 204, in order to determine whether or not it is that the current time point that the two-dimensional data becomes data representing a point located on a position which need not be subject to the clamping process.

Specifically, when the CPU 311 determines that the distance iLT is greater than or equal to 1 (Yes in step 206), the CPU 311 advances the process to step 207. On the other hand, when the CPU 311 determines that the distance iLT is less than 1 (No in step 206), the CPU 311 advances the process to step 208.

In step 207, the CPU 311 subtracts the distance (iLT) calculated from the previous two-dimensional data, from the distance (iL) calculated from the current two-dimensional data, to obtain the change per unit time (iLV) of the distance. In this step 207, the CPU 311 subtracts the distance (iLT) calculated from the previous two-dimensional data, from the distance (iL) calculated from the current two-dimensional data, to obtain iLV, i.e. the change per unit time (rate), in the distance. However, alternatively the CPU 311 may calculate, instead of such a calculation, a differential vector between the previous two-dimensional data and the current two-dimensional data, and obtains the magnitude of the resultant differential vector, to determine the rate based on the magnitude. In the case of measurable effect of movement of the keypad (the key top) of the analog stick in circumferential direction, it is preferable to calculate the rate based on the calculation of the present embodiment.

In step 208, the CPU 311 updates a value of the distance iLT. Specifically, the CPU 311 stores, as the distance iLT, the value of the distance (iL) calculated from the current two-dimensional data for the immediately following input value correction process.

In step 209, the CPU 311 updates the control parameter s. Specifically, the CPU 311 adds the rate iLV to a value of the control parameter s having been currently obtained (the parameter s indicates 1 when the initialization has been performed), and updates the control parameter s to the value obtained through the addition as the current parameter s.

A series of process steps, that is, steps 210 to 213 is a process for setting the control parameter s so as to indicate a value which is greater than or equal to 1 and not greater than N ($1 \leq s \leq N$).

In step 210, the CPU 311 determines whether or not the control parameter s is less than 1 (s<1). When the control parameter s is less than 1 (Yes in step 210), the CPU 311 advances the process to step 211. On the other hand, when the control parameter s is greater than or equal to 1 (No in step 210), the CPU 311 advances the process to step 212.

In step 211, the CPU 311 updates the control parameter s so as to indicate 1.

In step 212, the CPU 311 determines whether or not the control parameter s is greater than N (s>N). When the control parameter s is greater than N (Yes in step 212), the CPU 311 advances the process to step 213. On the other hand, when the control parameter s is less than or equal to N (No in step 212), the CPU 311 advances the process to step 214.

In step 213, the CPU 311 updates the control parameter s so as to indicate N.

In step 214, the CPU 311 subjects the two-dimensional data (ix, iy) to scaling. Specifically, the CPU 311 updates the component ix so as to indicate ix×(s/N), and updates the component iy so as to indicate iy×(s/N).

(Modification)

In the exemplary embodiment described above, the analog stick 15 for allowing the two-dimensional input is implemented as a specific input device. However, a person of ordinary skill in the art can easily understand that, according to the disclosure of the present invention, the input value correction processing program of the present invention is applicable to an input device for allowing one-dimensional input, or multi-dimensional data input such as three or more-dimensional data input.

Further, in the present embodiment, the input value correction processing program is described by using the game apparatus 10. However, in another embodiment, the input value correction processing program may be used for any information processing apparatus or any information processing system (for example, PDAs (Personal Digital Assistants), mobile telephones, personal computers, cameras, and the like).

Moreover, in the present embodiment, the game process is performed by a single apparatus (the game apparatus 10). However, according to another embodiment, in an image display system having a plurality of information processing apparatuses which are allowed to communicate with each other, an image display process may be shared and performed by the plurality of information processing apparatuses.

Further, various program modules may form a portion of an operating system of a computer. In this case, an application program is operable to call up the modules as necessary, and execute a desired process. Therefore, when the application program is used for hardware which is expected to provide a portion of a general-purpose module, such a general-purpose module may not necessarily be provided integrally with the application program. Therefore, when software in which the program does not include functions corresponding to the module is provided/distributed in a form of a computer-readable storage medium, or when the software is provided/distributed over the network, and the module described above complements functions, an effect equivalent to an effect obtained when the program itself is provided can be obtained as a result. Accordingly, if the module as described above can complement the functions, a game program which does not include the functions corresponding to the module as described above is construed as being substantially equivalent to the game program described above.

While the invention has been described in detail, the foregoing description is in all aspects illustrative and not restrictive. It is to be understood that numerous other modifications and variations can be devised without departing from the scope of the invention. It is also to be understood that the scope of the invention is indicated by the appended claims rather than by the foregoing description. It is also to be understood that the detailed description herein enables one skilled in the art to make changes coming within the meaning and equivalency range of the present invention. It is also to be understood that all of the patents, patent applications and publications recited herein are hereby incorporated by reference as if set forth in their entirety herein. It should be also understood that the terms as used herein have definitions typically used in the art unless otherwise mentioned. Thus, unless otherwise defined, all scientific and technical terms have the same meanings as those generally used by those skilled in the art to which the present invention pertain. If there is contradiction, the present specification (including the definitions) precedes.

What is claimed is:

1. A non-transitory computer-readable storage medium having stored therein an information processing program executed by a computer of an information processing apparatus for correcting data outputted from an input device, the information processing program causing the computer to provide processing comprising:
  an input data acquisition for acquiring, as object data, input data outputted from the input device; and
  a first input data update for sequentially updating the object data, when the input data becomes equal to or greater than an upper limit defined by allowed range of input operation on the input device, until the updated object data indicates a predetermined value which is greater than the upper limit value.

2. The non-transitory computer-readable storage medium according to claim 1, wherein the first input data update updates the object data such that the updated object data approaches the predetermined value greater than the upper limit value.

3. The non-transitory computer-readable storage medium according to claim 2, wherein the first input data update updates the object data such that the updated object data approaches, by a predetermined amount, the predetermined value greater than the upper limit value.

4. The non-transitory computer-readable storage medium according to claim 1, wherein the first input data update updates the object data, in accordance with change in an input-data derived amount per unit time, obtained when the input data becomes equal to or greater than an upper limit defined by allowed range of input operation on the input device.

5. The non-transitory computer-readable storage medium according to claim 1, wherein the input data indicates a position of a point which is displaced from a reference position which is set so as to correspond to a predetermined position in the input device.

6. The non-transitory computer-readable storage medium according to claim 5, wherein the first input data update updates the object data, in accordance with a change, per unit time, in a distance between the position defined by the input data, and the origin, which is the reference position.

7. The non-transitory computer-readable storage medium according to claim 5, wherein the first input data update updates the object data, in accordance with a change per unit time, in an amount derived from the input data, wherein the change per unit time is obtained through calculation of magnitude of a differential vector defined by position vectors representing the positions obtained at adjacent time points, one of which is the position defined by the input data.

8. The non-transitory computer-readable storage medium according to claim 1, wherein the processing further comprises a second input data update for sequentially updating the object data after an input data for the object data becomes equal to or greater than an upper limit defined by allowed range of input operation on the input device, the update being performed such that the input data becomes equal to or greater than the upper limit immediately before another input data is inputted and, if the another input data is not equal to or less than the upper limit, the second input data update sequentially updates the object data from the predetermined value up to the upper limit.

9. The non-transitory computer-readable storage medium according to claim 8, wherein the second input data update updates the object data such that a value of the object data approaches the upper limit value.

10. The non-transitory computer-readable storage medium according to claim 9, wherein the second input data update updates the object data such that the value of the object data approaches, by a predetermined amount, the upper limit value.

11. The non-transitory computer-readable storage medium according to claim 8, wherein the second input data update sequentially updates the object data after the input data becomes equal to or greater than an upper limit defined by allowed range of input operation on the input device, the updating being performed such that the input data becomes equal to or greater than the upper limit immediately before the another input data is inputted and, if the another input data is not equal to or less than the upper limit, the second input data update sequentially updates the object data based on a change, per unit time, in an amount derived from the input data and/or another input data.

12. The non-transitory computer-readable storage medium according to claim 1, wherein when the input data is equal to or greater than an upper limit defined by allowed range of input operation on the input device, the first input data update updates the object data, based on a change per unit time, in an amount derived from normalization of the input data, and the normalization is to multiply the input data by a predetermined value.

13. The non-transitory computer-readable storage medium according to claim 1, wherein the processing further comprises a preliminary correction for performing a clamping process for the input data before the input data acquisition acquires the input data as the object data.

14. The non-transitory computer-readable storage medium according to claim 1, wherein the processing further comprises performing a predetermined process by using, as an input value, the object data having been sequentially updated by the first input data update.

15. The non-transitory computer-readable storage medium according to claim 8, wherein the processing further comprises performing a predetermined process by using, as an input value, the object data having been sequentially updated by the second input data update.

16. The non-transitory computer-readable storage medium according to claim 1, wherein the input data is multi-dimensional data.

17. An information processing apparatus for correcting data outputted from an input device, the information processing apparatus comprising:
  an input data acquisition unit configured to acquire, as object data, input data outputted from the input device; and
  a first input data updating unit configured to sequentially update the object data, when the input data becomes equal to or greater than an upper limit defined by allowed range of input operation on the input device, until the updated object data indicates a predetermined value which is greater than the upper limit value.

18. The apparatus according to claim 17, wherein the first input data updating unit is configured to update the object data such that the updated object data approaches the predetermined value greater than the upper limit value.

19. The apparatus according to claim 17, wherein the first input data updating unit is configured to update the object data, in accordance with change in an input-data derived amount per unit time, obtained when the input data becomes equal to or greater than an upper limit defined by allowed range of input operation on the input device.

20. The apparatus according to claim 17, wherein the input data indicates a position of a point which is displaced from a reference position which is set so as to correspond to a predetermined position in the input device.

21. The apparatus according to claim 17, further comprising a second input data updating unit configured to sequentially update the object data after an input data for the object data becomes equal to or greater than an upper limit defined by allowed range of input operation on the input device, the update being performed such that the input data becomes equal to or greater than the upper limit immediately before another input data is inputted and, if the another input data is not equal to or less than the upper limit, the second input data updating unit sequentially updates the object data from the predetermined value up to the upper limit.

22. The apparatus according to claim 17, wherein when the input data is equal to or greater than an upper limit defined by allowed range of input operation on the input device, the first input data updating unit updates the object data, based on a change per unit time, in an amount derived from normalization of the input data, and the normalization is to multiply the input data by a predetermined value.

23. The apparatus according to claim 17, further comprising a preliminary correction unit configured to perform a clamping process for the input data before the input data acquisition unit acquires the input data as the object data.

24. The apparatus according to claim 17, further a processing unit configured to perform a predetermined process by using, as an input value, the object data having been sequentially updated by the first input data updating unit.

25. An information processing method performed by an information processing apparatus for correcting data outputted from an input device, the information processing method comprising
    acquiring, as object data, input data outputted from the input device; and
    sequentially updating the object data using at least one computer processor, when the input data becomes equal to or greater than an upper limit defined by allowed range of input operation on the input device, until the updated object data indicates a predetermined value which is greater than the upper limit value.

26. An information processing system for correcting data outputted from an input device, the information processing system comprising:
    an input configured to receive as object data, input data outputted from the input device; and
    a computer processor configured to sequentially update the object data, when the input data becomes equal to or greater than an upper limit defined by allowed range of input operation on the input device, until the updated object data indicates a predetermined value which is greater than the upper limit value.

* * * * *